(12) United States Patent
Hidesawa

(10) Patent No.: US 6,515,856 B2
(45) Date of Patent: *Feb. 4, 2003

(54) APPARATUS AND METHOD FOR COOLING IN A PERSONAL COMPUTER INCLUDING A TILT STAND

(75) Inventor: Shigeru Hidesawa, Kawasaki (JP)

(73) Assignee: Fujitsu Limited, Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/083,547

(22) Filed: May 21, 1998

(65) Prior Publication Data

US 2002/0054478 A1 May 9, 2002

(30) Foreign Application Priority Data

May 28, 1997 (JP) .............................................. 9-138382

(51) Int. Cl.⁷ ............................. H05K 5/00; H05K 7/20; F21B 33/00
(52) U.S. Cl. ........................ 361/687; 361/687; 361/688; 361/692; 361/694; 361/695; 165/80.2; 165/80.3
(58) Field of Search ................................ 361/687, 688, 361/692, 694, 695; 165/80.2, 80.3

(56) References Cited

U.S. PATENT DOCUMENTS

| | | | | |
|---|---|---|---|---|
| 4,748,540 A | * | 5/1988 | Hennberg et al. | 361/424 |
| 4,980,848 A | * | 12/1990 | Griffin et al. | 361/367 |
| 5,107,401 A | * | 4/1992 | Youn | 361/393 |
| 5,157,585 A | * | 10/1992 | Myers | 361/380 |
| 5,239,444 A | * | 8/1993 | Sasaki | 361/728 |
| 5,255,214 A | * | 10/1993 | Ma | 364/708.1 |
| 5,293,300 A | * | 3/1994 | Leung | 361/683 |

(List continued on next page.)

FOREIGN PATENT DOCUMENTS

| | | | |
|---|---|---|---|
| JP | 4-284519 | * | 10/1992 |
| JP | 5-55212 | | 7/1993 |
| JP | 6-318124 | | 11/1994 |
| JP | 7-311632 | | 11/1995 |
| JP | 7-319579 | | 12/1995 |
| JP | 8-272487 | * | 10/1996 |
| JP | 9-214162 | | 8/1997 |
| JP | 10-163648 | | 6/1998 |
| JP | 10-289036 | | 10/1998 |

*Primary Examiner*—Leo P. Picard
*Assistant Examiner*—Anatoly Vortman
(74) *Attorney, Agent, or Firm*—Staas & Halsey LLP

(57) ABSTRACT

An information processing device including a keyboard for inputting characters or the like, a display for displaying the characters or the like input from the keyboard, a printed wiring board on which electronic components for performing process and display control of the characters or the like input from the keyboard are mounted, and a housing for supporting the keyboard, the display, and the printed wiring board. The information processing device further includes a laterally horizontal shaft supported to a rear portion of the housing, a hollow tilt stand pivotably mounted on the shaft to take a retracted position where the tilt stand is horizontally retracted at a bottom portion of the housing and a raised position where the tilt stand is substantially vertically raised to support the housing in its tilted condition, and a fan provided in the tilt stand. The tilt stand has opposed side walls formed with first ventilation holes. The bottom portion of the housing is formed with second ventilation holes. Heat generated from the electronic components is expelled through the first and second ventilation holes to the outside of the device by the fan.

29 Claims, 6 Drawing Sheets

U.S. PATENT DOCUMENTS

| | | | | |
|---|---|---|---|---|
| 5,506,749 A | * | 4/1996 | Matsuda | 361/683 |
| 5,552,967 A | * | 9/1996 | Seto et al. | 361/818 |
| 5,583,744 A | * | 12/1996 | Oguchi et al. | 361/683 |
| 5,590,024 A | * | 12/1996 | Honda et al. | 361/684 |
| 5,642,258 A | * | 6/1997 | Barrus et al. | 361/683 |
| 5,691,880 A | * | 11/1997 | Seto et al. | 361/681 |
| 5,694,294 A | * | 12/1997 | Ohashi et al. | 361/687 |
| 5,721,670 A | * | 2/1998 | Cochrane et al. | 361/695 |
| 5,978,225 A | * | 11/1999 | Kamphulis | 361/707 |
| 5,497,288 A | * | 12/1999 | Otis et al. | 361/687 |
| 6,008,986 A | * | 12/1999 | Mok | 361/687 |
| 6,181,554 B1 | * | 1/2001 | Cipolla et al. | 361/687 |
| 6,191,941 B1 | * | 2/2001 | Ito et al. | 361/683 |

* cited by examiner

APPARATUS AND METHOD FOR COOLING IN A PERSONAL COMPUTER INCLUDING A TILT STAND

BACKGROUND OF THE INVENTION

1. Field of the Invention

The present invention relates to an information processing device, and more particularly to a cooling structure for cooling electronic components in an information processing device such as a notebook personal computer.

2. Description of the Related Art

With the recent widespread use of a notebook personal computer especially for improvement in work efficiency, diverse functions have been required for the computer to result in high-density mounting of high-integration electronic components having high heating values on a printed wiring board built in the computer. Furthermore, the requirement for high-speed operation of a CPU causes an increase in power consumption to result in an increase in heating value. Accordingly, it is necessary to efficiently cool such electronic components.

FIG. 1 is a perspective view of a notebook personal computer as an information processing device in the prior art. The notebook personal computer shown in FIG. 1 includes a housing 2, a keyboard 6, and a display 8 both mounted on the housing 2. Although not shown, a printed wiring board is mounted in the housing 2, and electronic components including a CPU are mounted on the printed wiring board. A fan 12 for cooling the electronic components is mounted at a rear end portion of the housing 2. Further, a tilt stand 14 for adjusting a view angle of the display 8 is provided. A plurality of vent holes 4 are formed through a front wall of the housing 2 to introduce air into the housing 2, and a ventilation hole 10 is formed at the rear end of the housing 2 to expel the inside hot air. By driving the fan 12, heat generated from the electronic components, especially from the CPU is forcibly expelled to the outside of the housing 2.

However, a sufficient space cannot be defined between the fan 12 and the electronic components in the conventional information processing device because of its reduced size and weight. As a result, an efficient ventilation space for expelling the heat from the electronic components cannot be defined, thus hindering ideal heat dissipation.

SUMMARY OF THE INVENTION

It is therefore an object of the present invention to provide an information processing device which can efficiently expel the heat with an increased ventilation space.

In accordance with an aspect of the present invention, there is provided an information processing device having electronic components and a housing, the information processing device comprising a hollow tilt stand pivotably mounted on a first shaft to take a retracted position where the tilt stand is horizontally retracted at a bottom portion of the housing and a raised position where the tilt stand is substantially vertically raised to support the housing in its tilted condition; and a fan provided in the tilt stand for expelling heat from the electronic components.

Preferably, the information processing device further comprises a first terminal connected to a driving section of the fan; a second shaft supported to the rear portion of the housing; a power supply for supplying a supply voltage to the electronic components and the driving portion of said fan; and a switch pivotably mounted on the second shaft and having a second terminal connected to the power supply, the switch being rotatable between a first position where the second terminal is separate from the first terminal in the retracted position of the tilt stand and a second position where the second terminal is kept in contact with the first terminal by pressure of the tilt stand in the raised position thereof.

Preferably, the information processing device further comprises a projection formed on the tilt stand; clock switching means having a first terminal for inputting a first clock signal, a second terminal for inputting a second clock signal, a third terminal for inputting a control signal, for outputting to the electronic components one of the first clock signal input to the first terminal and the second clock signal input to the second terminal according to the control signal input to the third terminal; a second shaft supported to the rear portion of the housing; a power supply for supplying a supply voltage to the electronic components, the fan, and the clock switching means; and a switch pivotably mounted on the second shaft and having a fourth terminal connected to the power supply, the switch being rotatable between a first position where the switch is separate from the projection of the tilt stand in the retracted position thereof to make separation of the third terminal and the fourth terminal and a second position where the switch is in pressure contact with the projection of the tilt stand in the raised position thereof to make contact of the third terminal and the fourth terminal.

More preferably, the information processing device further comprises an extensible partition member elongated over the width of the tilt stand in the lateral direction of the housing, the extensible partition member having a front end fixed to the bottom portion of the housing and a rear end fixed to the tilt stand; wherein when the tilt stand is in the retracted position, the extensible partition member is folded to fill a gap defined between the bottom portion of the housing and the tilt stand, whereas when the tilt stand is in the raised position, the extensible partition member is extended to define an optimum ventilation space in cooperation with the bottom portion of the housing and the tilt stand.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
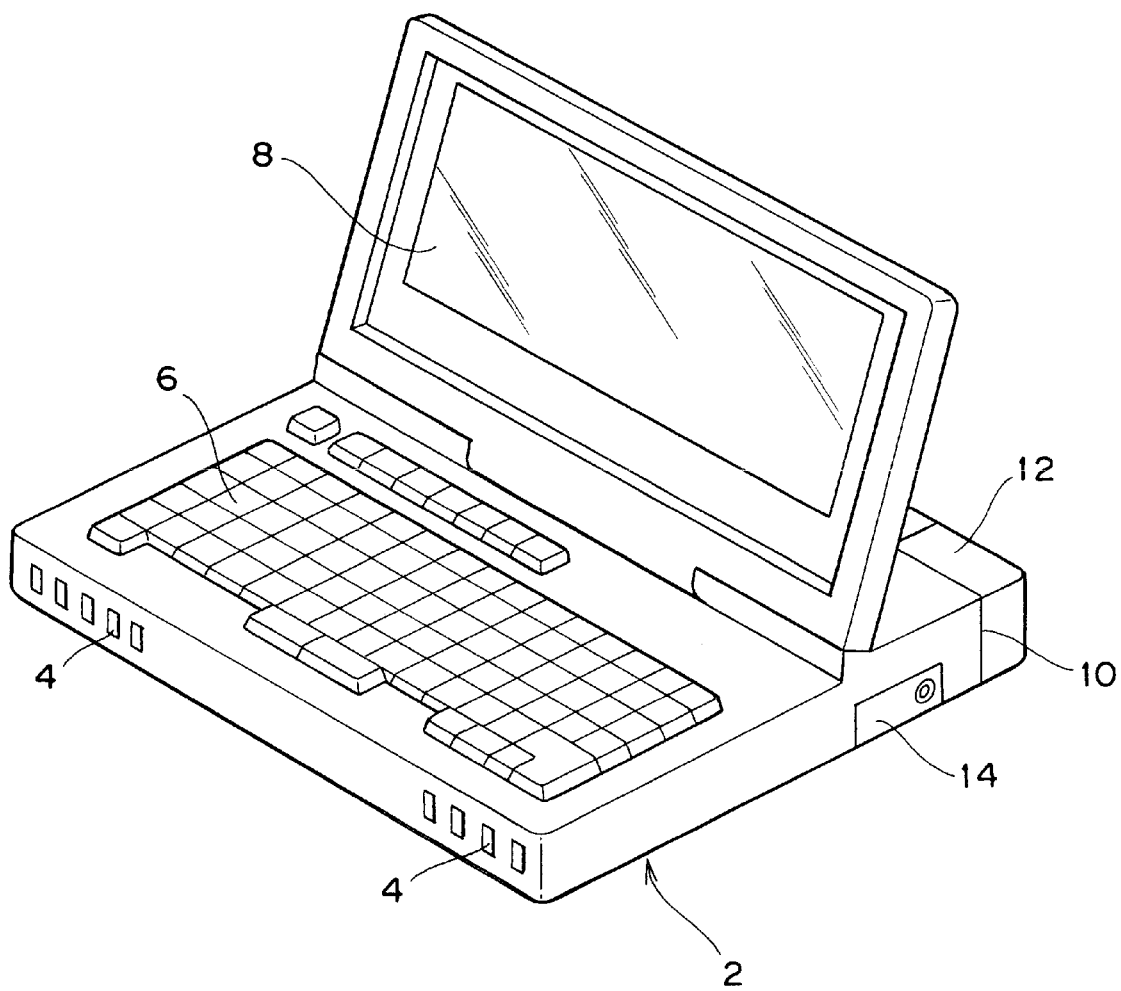
FIG. 1 is a perspective view of an information processing device in the prior art.
Figure 2:
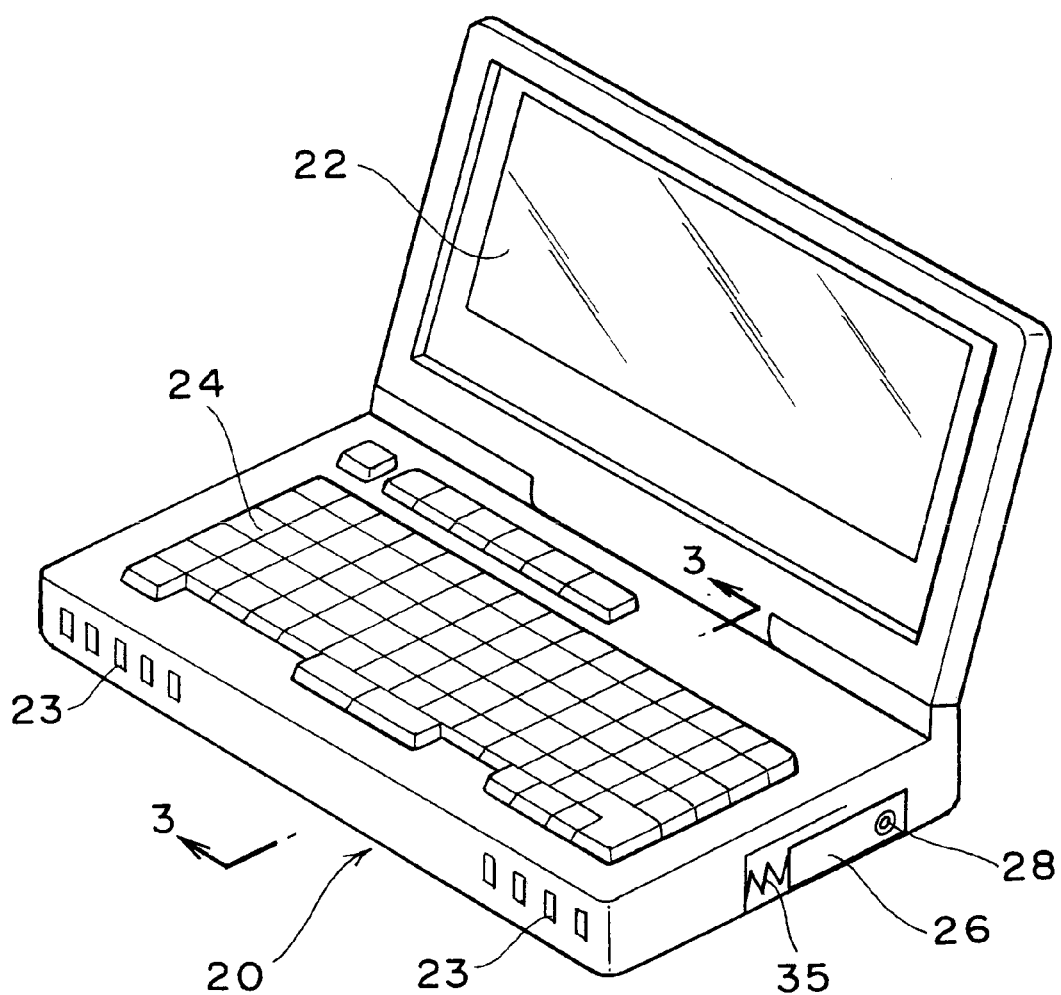
FIG. 2 is a perspective view of an information processing device according to a preferred embodiment of the present invention.
Figure 3:
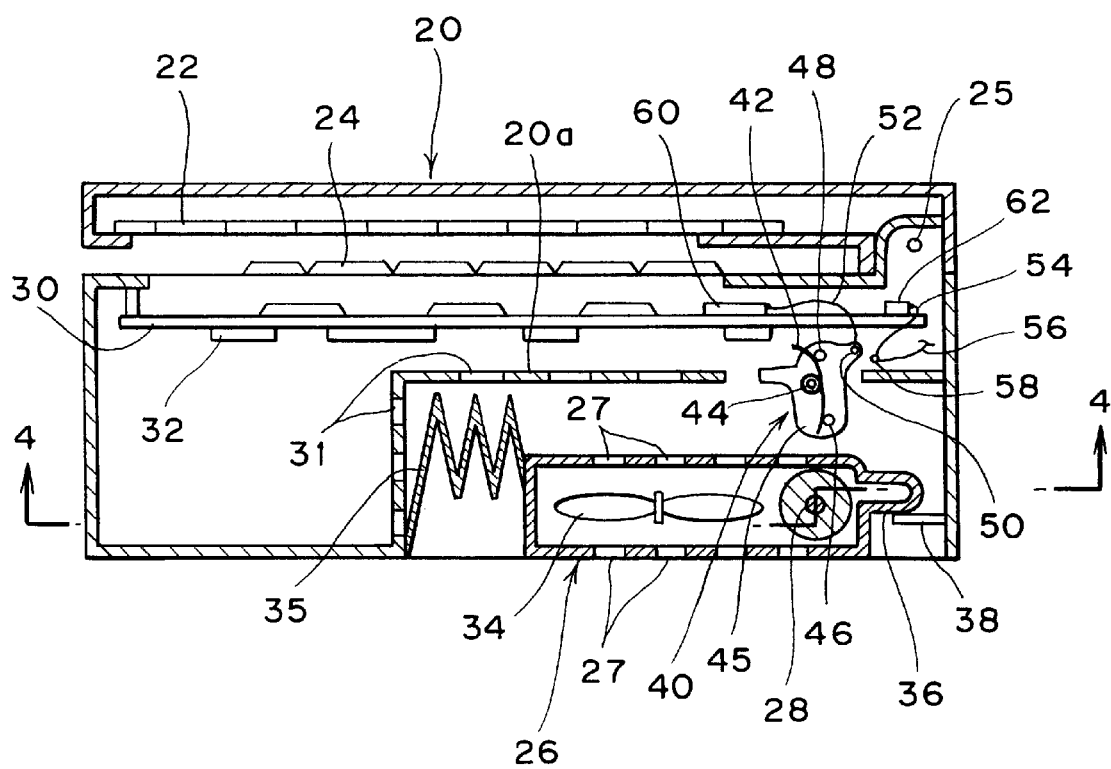
FIG. 3 is a cross section taken along the line 3—3 in FIG. 2.
Figure 4:
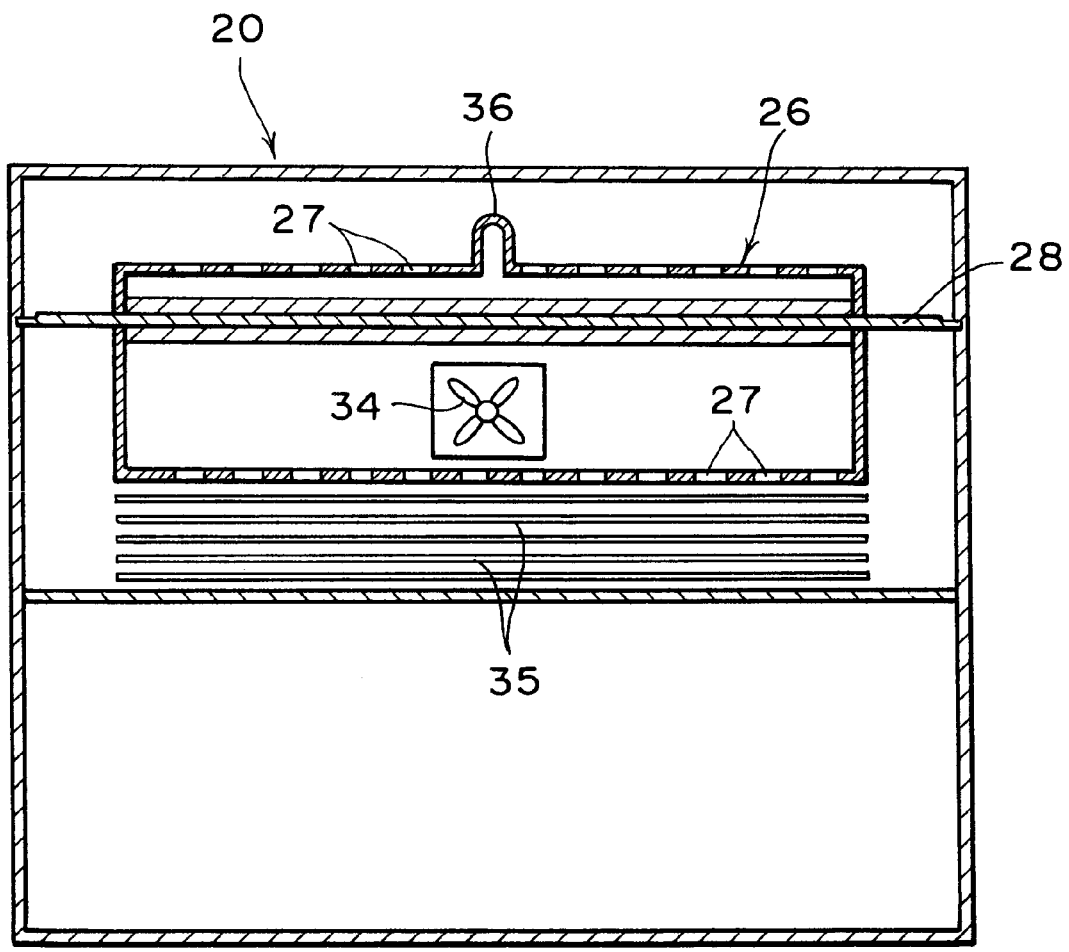
FIG. 4 is a cross section taken along the line 4—4 in FIG. 3.

FIG. 2 is a perspective view of an information processing device according to a preferred embodiment of the present invention. FIG. 3 is a cross section taken along the line 3—3 in FIG. 2. FIG. 4 is a cross section taken along the line 4—4 in FIG. 3. As shown in FIGS. 2 to 4, the information processing device includes a housing 20, a display 22 pivotably supported through a horizontal shaft 25 to the housing 20 at its rear upper portion, a keyboard 24 horizontally supported to the housing 20, a printed wiring board 30 accommodated in the housing 20, a tilt stand 26 pivotably supported through a horizontal shaft 28 to the housing 20 at its rear lower portion, and an extensible partition member 35 connected between the housing 20 and the tilt stand 26. A plurality of vent holes 23 are formed through a front wall of the housing 20. A plurality of electronic components 32 including a CPU, a power supply 60, and a clock switching element 62 are mounted on the printed wiring board 30 accommodated in the housing 20. The CPU having a higher heating value in the electronic components 32 is mounted on the lower surface of the printed wiring board 30 at its rear portion above the tilt stand 26 in its horizontal or retracted position as shown in FIG. 3.

The housing 20 has a right-angled bottom portion 20a opposed to the tilt stand 26 in its retracted position. This bottom portion 20a of the housing 20 is formed with a plurality of ventilation holes 31 such as slits. The slits may be formed by cutting a sheet metal or plastic. The tilt stand 26 is a laterally elongated, hollow boxlike member having opposed side walls formed with a plurality of ventilation holes 27 such as slits. The tilt stand 26 is rotatable about 90 degrees about the horizontal shaft 28 supported to the housing 20. A stopper 38 projects inward from a rear wall of the housing 20, so as to maintain a substantially vertical or raised position of the tilt stand 26. A projection 36 is formed at a rear end of the tilt stand 26 in its retracted position so as to project toward the rear wall of the housing 20. A fan 34 is provided in the tilt stand 26.

The fan 34 is constructed as a single fan unit consisting of a driving section and a rotating blade section integrated together, and this single fan unit is located at a substantially central position in the tilt stand 26. Alternatively, a plurality of fans may be provided in the tilt stand 26, or the driving section and the rotating blade section may be separated. The extensible partition member 35 is a laterally elongated, bellowslike member normally folded in the longitudinal direction of the housing 20 and connected between the housing 20 and the tilt stand 26 to fill a gap defined therebetween. That is, the extensible partition member 35 has a front end fixed to a vertical wall of the right-angled bottom portion 20a of the housing 20 and a rear end fixed to a front end of the tilt stand 26 in its retracted position. In the retracted position of the tilt stand 26, the partition member 35 is folded in the gap between the vertical wall of the bottom portion 20a of the housing 20 and the front end of the tilt stand 26.

Figure 6:
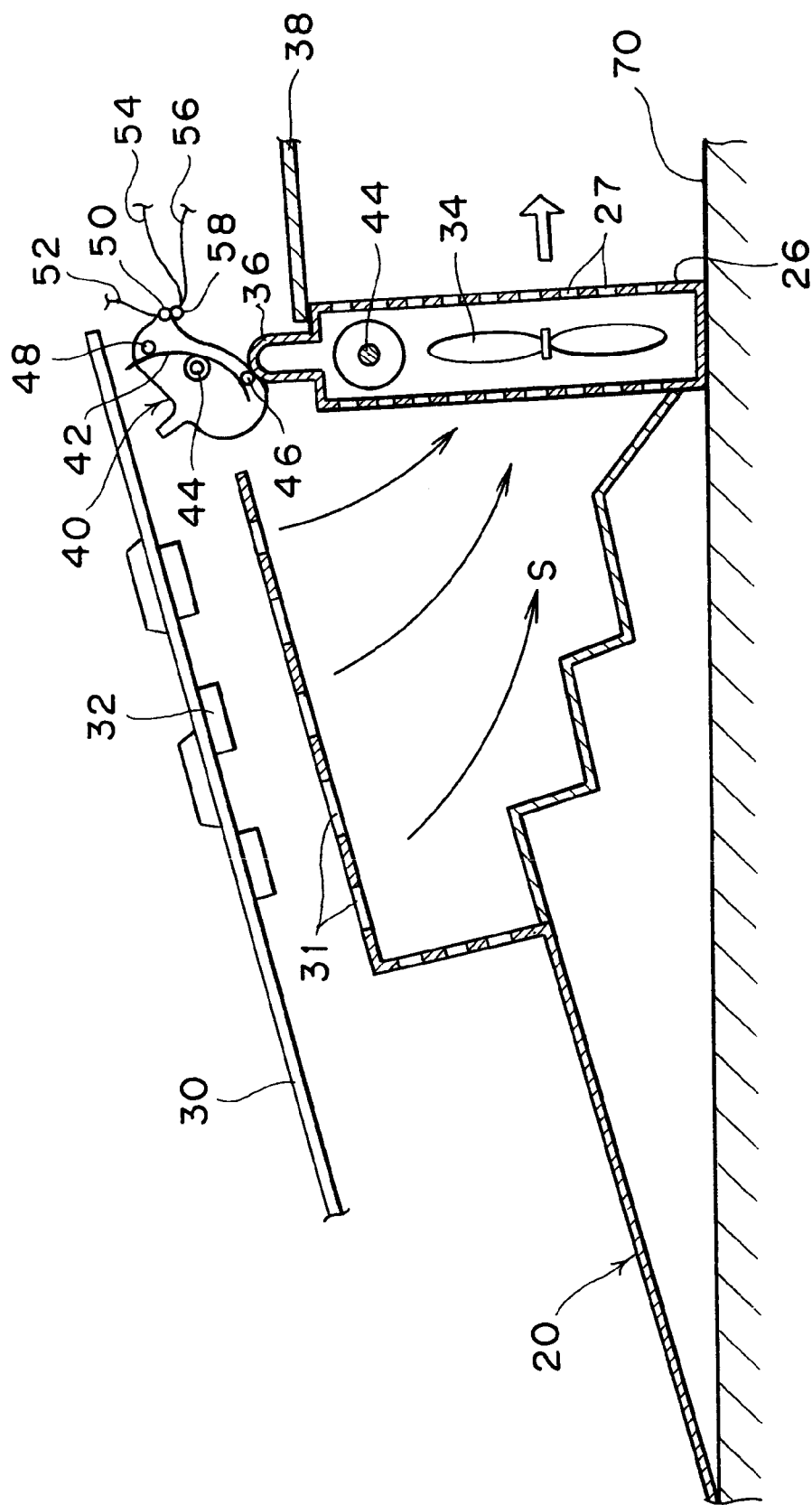
FIG. 6 is a vertical sectional view of an essential part of the information processing device shown in FIG. 2, for illustrating the operation thereof.

In the raised position of the tilt stand 26 as shown in FIG. 6, there is defined an optimum ventilation space S by the tilt stand 26, the partition member 35, and the housing 20 by the extension of the partition member 35. The partition member 35 is formed of any extensible material such as plastics. If the partition member 35 is not provided, a larger ventilation space is defined by the tilt stand 26, the housing 20, and a desk on which the device is placed in the raised position of the tilt stand 26, so that heat from the electronic components 32 may be diffused to an extra area of the ventilation space, and accordingly there is a possibility that the heat cannot be enough expelled by the fan 34. By determining an optimum mounting position of the partition member 35 in consideration of the capacity of the fan 34, etc., the optimum ventilation space S can be defined. A switch 40 is pivotably mounted on a horizontal shaft 44 supported to the housing 20. In the retracted position of the tilt stand 26, the switch 40 is separate from the projection 36 of the tilt stand 26. In the raised position of the tilt stand 26, the switch 40 is in contact with the projection 36. In raising the tilt stand 26, the projection 36 comes into contact with the switch 40 and rotates the switch 40 about the shaft 44 clockwise as viewed in FIG. 3.

A spring 42 is wound around the shaft 44 and supported to a lower projection 46 and an upper projection 48 of the switch 40. The switch 40 has a terminal 50 formed of conductor at an upper position. In the retracted position of the tilt stand 26, the terminal 50 of the switch 40 is separate from a terminal 58 supported to the housing 20. In the raised position of the tilt stand 26, the terminal 50 of the switch 40 is in contact with the terminal 58 of the housing 20. A wire 52 is connected at its one end to the terminal 50 and connected at the other end to the power supply 60. On the other hand, a wire 54 is connected at its one end to the terminal 58 and connected at the other end to a clock switching element 62, and a wire 56 is connected at its one end to the terminal 58 and connected at the other end to the driving section (not shown) of the fan 34. The power supply 60 functions to supply a supply voltage from a battery (not shown) accommodated in the housing 20 or from an adapter (not shown) for converting a commercial AC voltage into a DC voltage, to the electronic components 32, the clock switching element 62, and the driving section of the fan 34. The clock switching element 62 receives a high-speed clock signal CLK1 having a frequency of 100 MHz, for example, and a low-speed clock signal CLK2 having a frequency of 50 MHz, for example from a clock generating circuit (not shown), and further receives a control signal for a supply voltage or a ground potential from the switch 40. When the potential of the control signal is equal to the supply voltage, the clock switching element 62 supplies the high-speed clock signal CLK1 to the electronic components 32, whereas when the potential of the control signal is equal to the ground potential, the clock switching element 62 supplies the low-speed clock signal CLK2 to the electronic components 32.

Figure 5A:
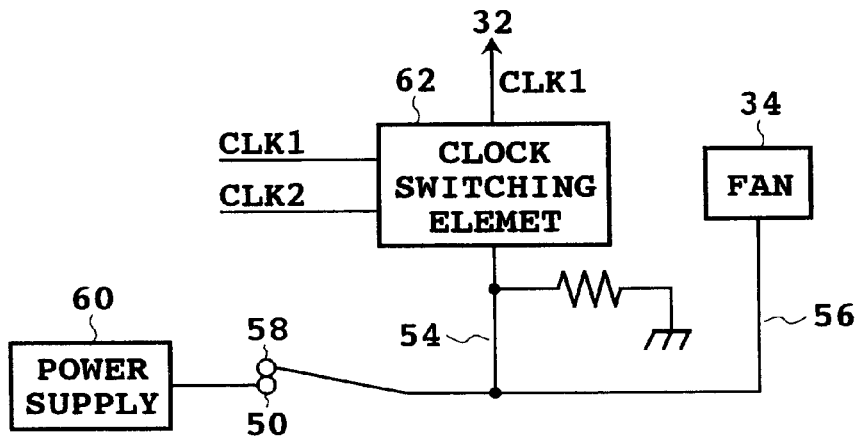
FIGS. 5A and 5B are block diagrams for illustrating the operation of the information processing device shown in FIG. 2.
Figure 5B:
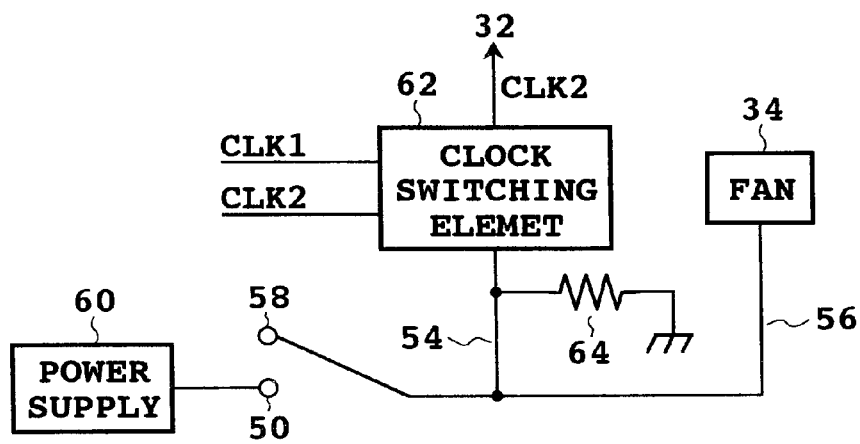

FIGS. 5A, 5B, and 6 illustrate the operation of the information processing device shown in FIG. 2. The operation of the information processing device shown in FIG. 2 will now be described with reference to these figures.

(a) Operation in the raised position of the tilt stand 26:

In the case of using the device in the raised position of the tilt stand 26, the adapter is used in general. In this case, a commercial AC voltage is converted into a DC voltage by the adapter, and the DC voltage is supplied as a supply voltage from the power supply 60 to the electronic components 32, the clock switching element 62, and the fan 34. The tilt stand 26 is rotated about the shaft 28 counterclockwise as viewed in FIG. 3 by a user until the tilt stand 26 abuts against the stopper 38 as shown in FIG. 6. Accordingly, the tilt stand 26 is supported in a substantially vertical position by the stopper 38 and placed on a desk 70 or the like. At the same time, the folded partition member 35 is extended by the rotation of the tilt stand 26 as shown in FIG. 6, thereby defining the optimum ventilation space S among the partition member 35, the tilt stand 26, and the right-angled bottom portion 20a of the housing 20.

Further, the projection 36 of the tilt stand 26 rotates counterclockwise and comes into contact with the lower projection 46 of the switch 40 to press the switch 40 and rotate it about the shaft 44 clockwise as viewed in FIG. 6 against the biasing force of the spring 42. As a result, the terminal 50 of the switch 40 comes into contact with the terminal 58 as shown in FIGS. 5A and 6, thereby supplying the supply voltage from the power supply 60 to the terminal 58. Because the terminal 58 is connected through the wire 54 to a terminal for inputting the control signal for the clock switching element 62 and also connected through the wire 56 to the driving section of the fan 34, the potential of the control signal for the clock switching element 62 becomes equal to the supply voltage from the power supply 60, and the clock switching element 62 supplies the high-speed clock signal CLK1 to the electronic components 32. Accordingly, the CPU is operated by the high-speed clock signal CLK1. Further, the supply voltage is supplied to the driving section of the fan 34 to operate the fan 34. On the other hand, the heat generated from the electronic components 32 including the CPU operated by the high-speed clock signal CLK1 is relieved through the ventilation holes 31 of the bottom portion 20a of the housing 20 into the ventilation space S. The heat in the ventilation space S is next expelled through the ventilation holes 27 of the tilt stand 26 to the outside of the device by the operation of the fan 34, thereby cooling the electronic components 32. The ventilation space S is optimally formed, and the CPU having a higher heating value in the electronic components 32 is located near the ventilation holes 31. Accordingly, the heat generated from the electronic components 32 can be efficiently relieved to the ventilation space S.

(b) Operation in the retracted position of the tilt stand 26:

In the case of using the device in the retracted position of the tilt stand 26, the battery is often used as a power source without using the adapter, and the device is used on the user's lap, for example. In retracting the tilt stand 26 from the raised position shown in FIG. 6, the tilt stand 26 is rotated clockwise as viewed in FIG. 6 by the biasing force of the spring 42. As a result, the projection 36 of the tilt stand 26 is separated from the switch 40, and the terminal 50 of the switch 40 is also separated from the terminal 58 as shown in FIGS. 3 and 5B. Accordingly, the potentials at the wire 54 and the terminal 58 become equal to a ground potential, so that the potential of the control signal for the clock switching element 62 becomes equal to a ground potential, and the clock switching element 62 supplies the low-speed clock signal CLK2 to the electronic components 32.

As a result, the CPU is operated at a low speed, thereby suppressing current consumption and heat generation. Accordingly, although the device is used on the user's lap, possible low-temperature burn to the user due to the heat expelled from the device can be suppressed. Further, because the potential at the wire 56 also becomes equal to a ground potential, the fan 34 is not driven, thereby eliminating power consumption of the battery due to the operation of the fan 34.

As described above, the fan 34 is provided in the tilt stand 26 having the ventilation holes 27. In the raised position of the tilt stand 26, the CPU is operated at a high speed, and the fan 34 is driven to forcibly expel the heat from the CPU through the sufficient ventilation space S to the outside of the device, thereby efficiently cooling the CPU. On the other hand, in the retracted position of the tilt stand 26, the CPU is operated at a low speed to suppress heat generation from the CPU, thereby suppressing the occurrence of low-temperature burn in the case of using the device on the user's lap.

According to the present invention, a sufficient ventilation space can be defined in the raised position of the tilt stand 26, and the heat generated from the electronic components can be efficiently expelled through the ventilation space by the fan built in the tilt stand.

What is claimed is:

1. An electronic apparatus comprising:

an electronic component;

a housing to house said electronic component;

a tilt stand provided in a rear portion of said housing to tilt said housing; and a radiation space forming mechanism, being at least a part of a bottom portion of said housing, to form a radiation space, between the bottom portion and said electronic component, for expelling heat from said electronic component when said housing is tilted by said tilt stand.

2. An electronic apparatus according to claim 1, wherein said tilt stand has at least one ventilation hole.

3. An electronic apparatus according to claim 1, further comprising a fan to expel heat.

4. An electronic apparatus according to claim 1, wherein said tilt stand has a fan to expel heat.

5. An electronic apparatus according to claim 1, further comprising a fan to expel heat, wherein said fan is driven when said housing is tilted by said tilt stand.

6. An electronic apparatus according to claim 1, wherein a clock frequency of said electronic apparatus is changed when said housing is tilted by said tilt stand.

7. An electronic apparatus according to claim 1, wherein said housing has an input unit.

8. An electronic apparatus according to claim 1, wherein said housing has a display unit.

9. An electronic apparatus according to claim 2, wherein said ventilation hole ventilates said radiation space.

10. An electronic apparatus comprising:

an electronic component;

a housing to house said electronic component; and a tilt stand provided in a rear portion of said housing for tilting said housing;

wherein said tilt stand is at least a part of a bottom portion of said housing and has at least one ventilation hole to cool said electronic component.

11. An electronic apparatus according to claim 10, further comprising a fan to expel heat.

12. An electronic apparatus according to claim 10, wherein said tilt stand has a fan to expel heat.

13. An electronic apparatus according to claim 10, further comprising a fan to expel heat, wherein said fan is driven when said housing is tilted by said tilt stand.

14. An electronic apparatus according to claim 10, wherein a clock frequency of said electronic apparatus is changed when said housing is tilted by said tilt stand.

15. An electronic apparatus according to claim 10, wherein said housing has an input unit.

16. An electronic apparatus according to claim 10, wherein said housing has a display unit.

17. An electronic apparatus comprising:

a housing;

a tilt stand provided in a rear portion of said housing to tilt said housing; and a fan to expel heat, wherein said fan is driven when said housing is tilted by said tilt stand.

18. An electronic apparatus comprising:
a housing; and
a tilt stand provided in a rear portion of said housing to tilt said housing,
wherein a clock frequency of said electronic apparatus is changed when said housing is tilted by said tilt stand.

19. An electronic apparatus comprising:
a housing; and
a tilt stand provided in a rear portion of said housing to tilt said housing,
wherein power is supplied to a specified part of said electronic apparatus when said housing is tilted by said tilt stand.

20. An electronic apparatus comprising:
an electronic component;
a housing to house said electronic component;
a tilt stand retracted to a bottom portion of said housing when said tilt stand is folded, said tilt stand supporting said housing and forming a radiation space when said tilt stand is raised; and
a fan provided in said tilt stand to expel heat.

21. An electronic apparatus according to claim 20, wherein said tilt stand has at least one ventilation hole.

22. An electronic apparatus according to claim 20, where in at said bottom portion of said housing is formed a second ventilation hole locating at an upper part of said tilt stand in a position where said tilt stand is retracted.

23. An apparatus, comprising:
a housing; and
a tilt stand to movably operate to tilt said housing, said tilt stand and a portion of said housing forming a radiation space upon a raising of the tilt stand to tilt said housing, wherein the radiation sapce allows selective dissipation of heat at least from contents of the housing when the tilt stand is raised,
wherein a clock frequency of the contents of the housing is changed when said tilt stand is raised.

24. A method of cooling an electronic apparatus, comprising:
forming a radiation space between a bottom of a housing of the electronic apparatus and a raised tilt stand; and
expelling heat from the electronic apparatus through the radiation space, when the tilt stand is raised.

25. The method of claim 24, wherein the expelling heat from the electronic apparatus includes starting a fan, to expel heat through the radiation space, when the tilt stand is raised.

26. A method of cooling an electronic apparatus, comprising changing the clock frequency of the electronic apparatus when a tilt stand is raised.

27. An apparatus, comprising:
a housing; and
a tilt stand to tilt said housing, said tilt stand and a portion of said housing forming a radiation space, wherein the radiation space allows dissipation of heat at least from contents of the housing when the tilt stand is raised.

28. The apparatus of claim 27, wherein a clock frequency of the contents of the housing is changed when said tilt stand is raised.

29. The apparatus of claim 27, further comprising a fan to expel heat from the radiation space when said tilt stand is raised.

* * * * *